Aug. 8, 1961 C. B. WILLIAMS 2,995,480
METHOD AND APPARATUS FOR PRESSING LAMINATED SAFETY GLASS
Filed Oct. 7, 1957 6 Sheets-Sheet 1
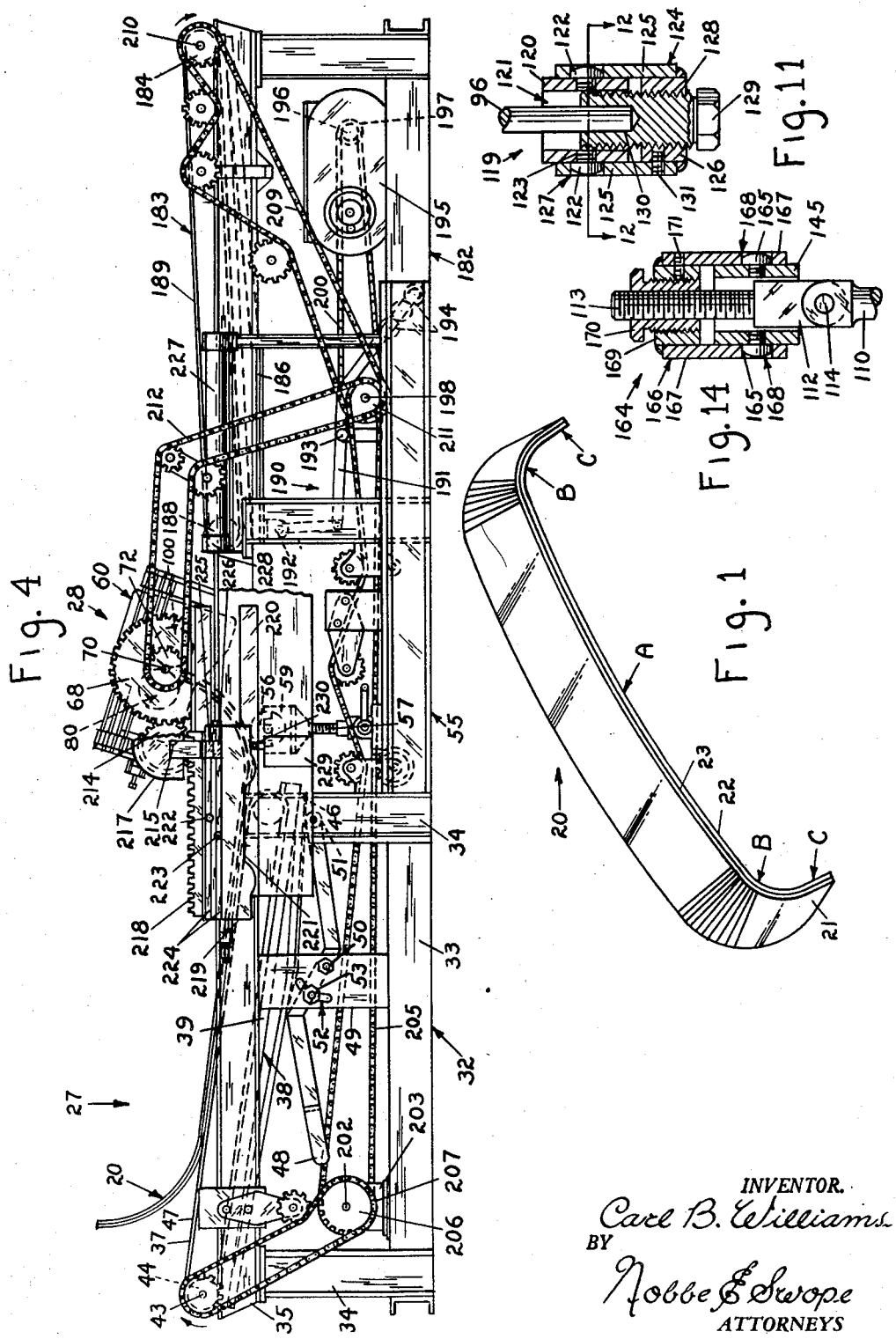
INVENTOR.
Carl B. Williams
BY
Nobbe & Swope
ATTORNEYS Aug. 8, 1961     C. B. WILLIAMS     2,995,480
METHOD AND APPARATUS FOR PRESSING LAMINATED SAFETY GLASS
Filed Oct. 7, 1957     6 Sheets-Sheet 2
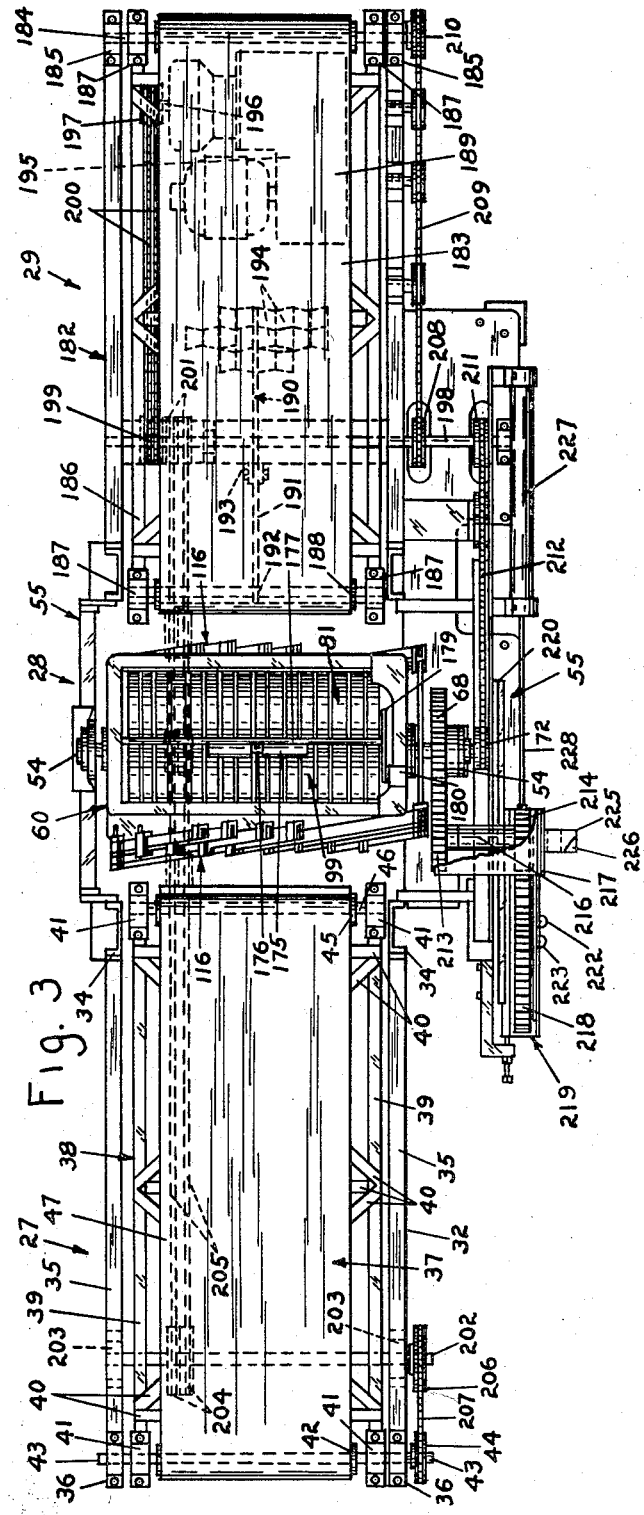
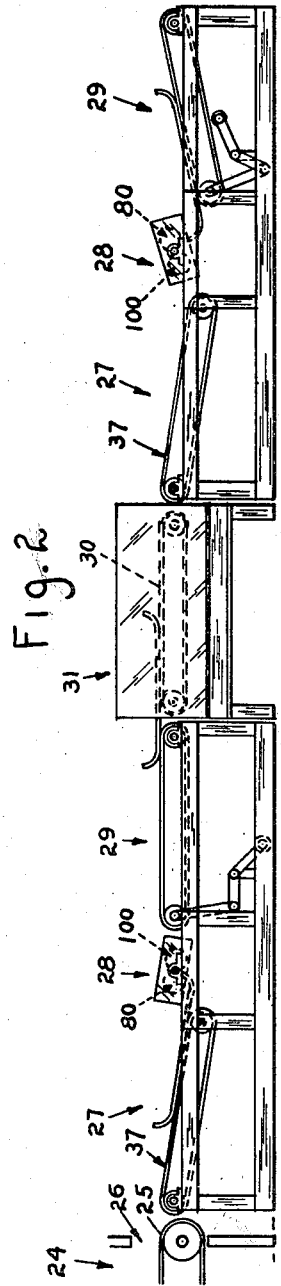
INVENTOR.
Carl B. Williams
BY
Nobbe & Swope
ATTORNEYS

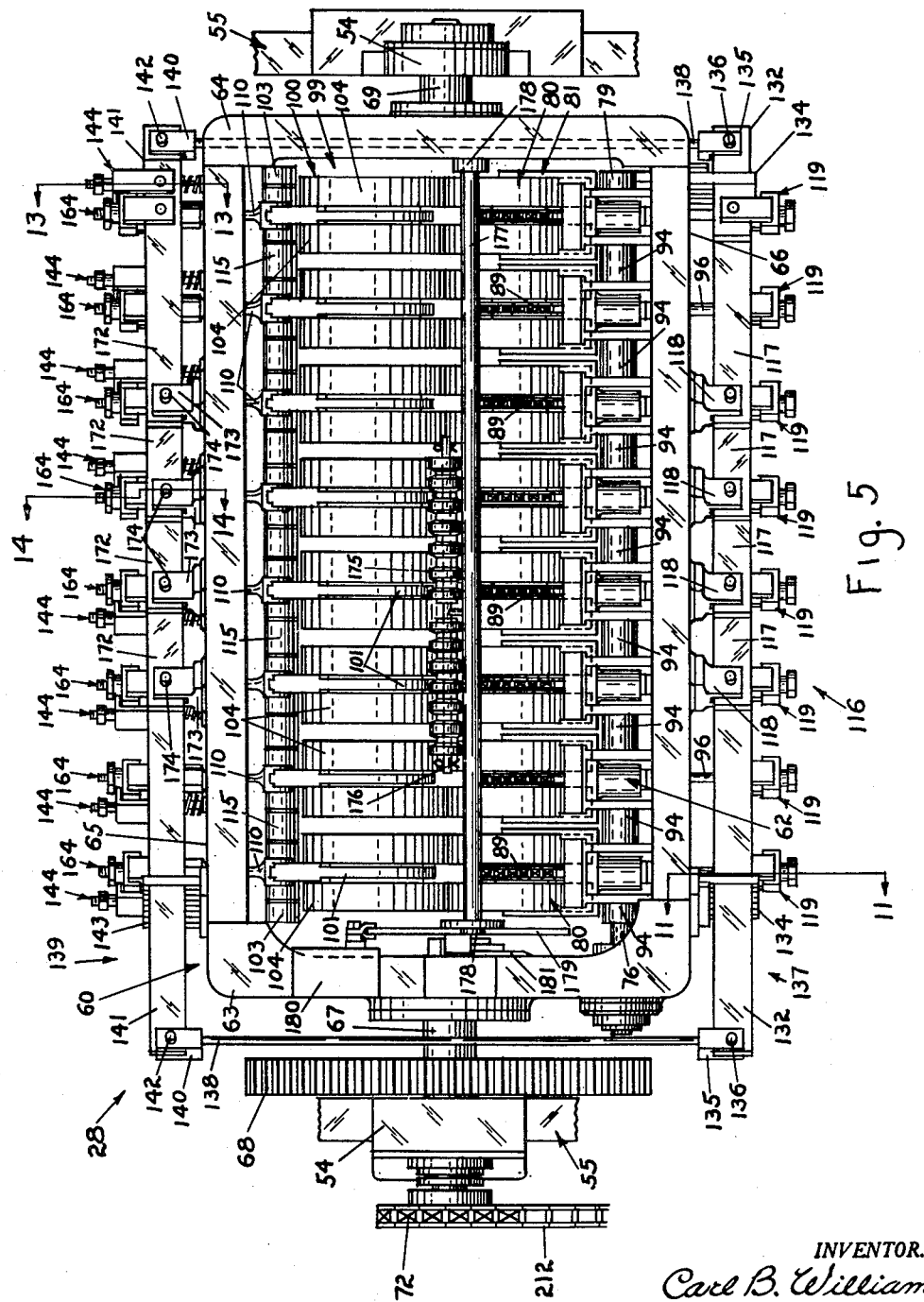

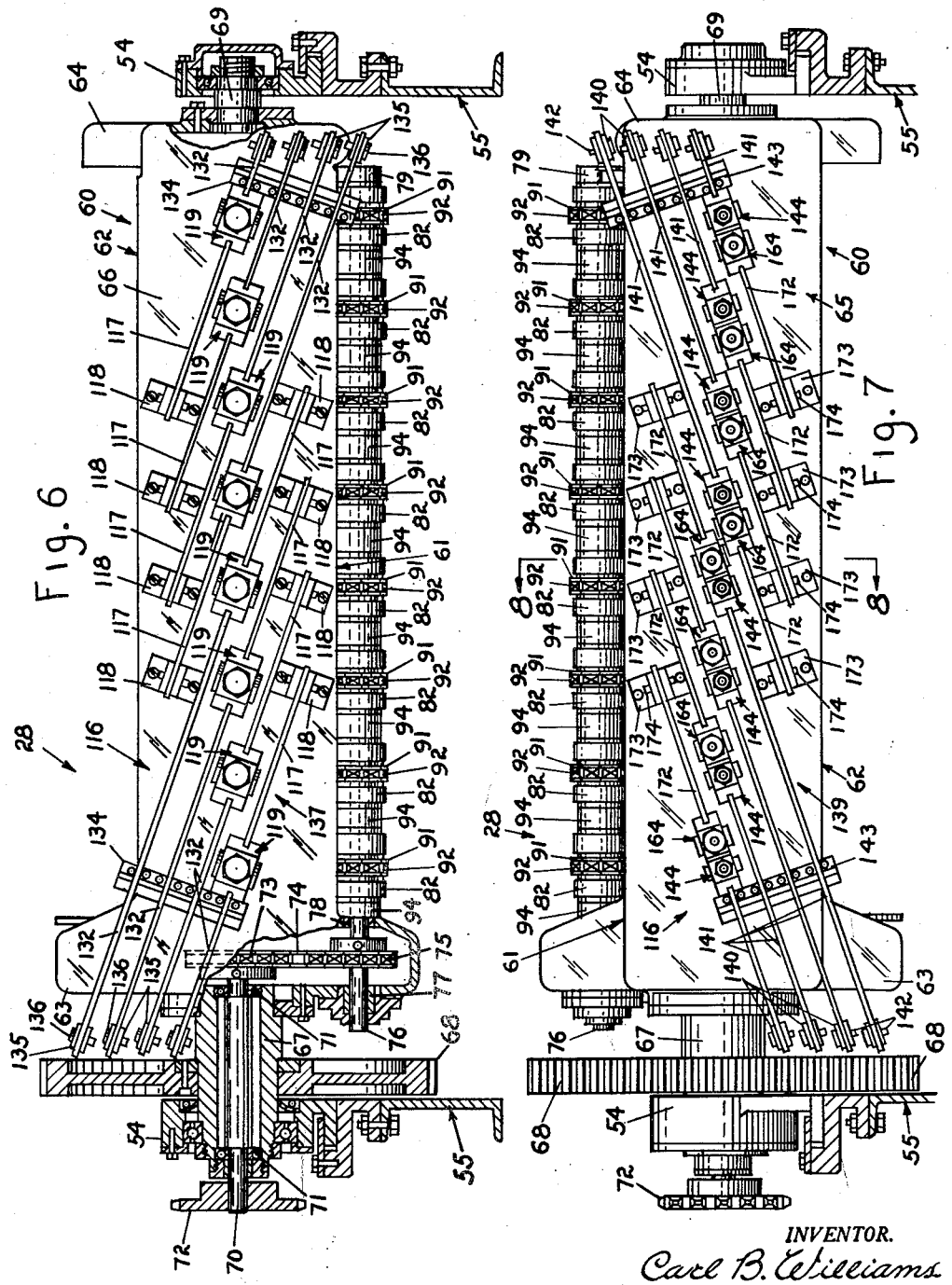

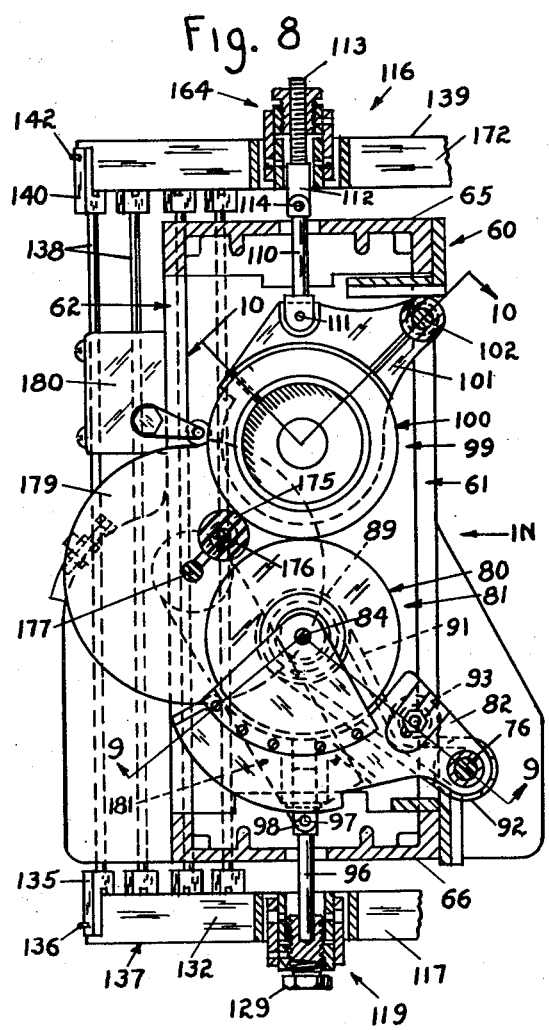

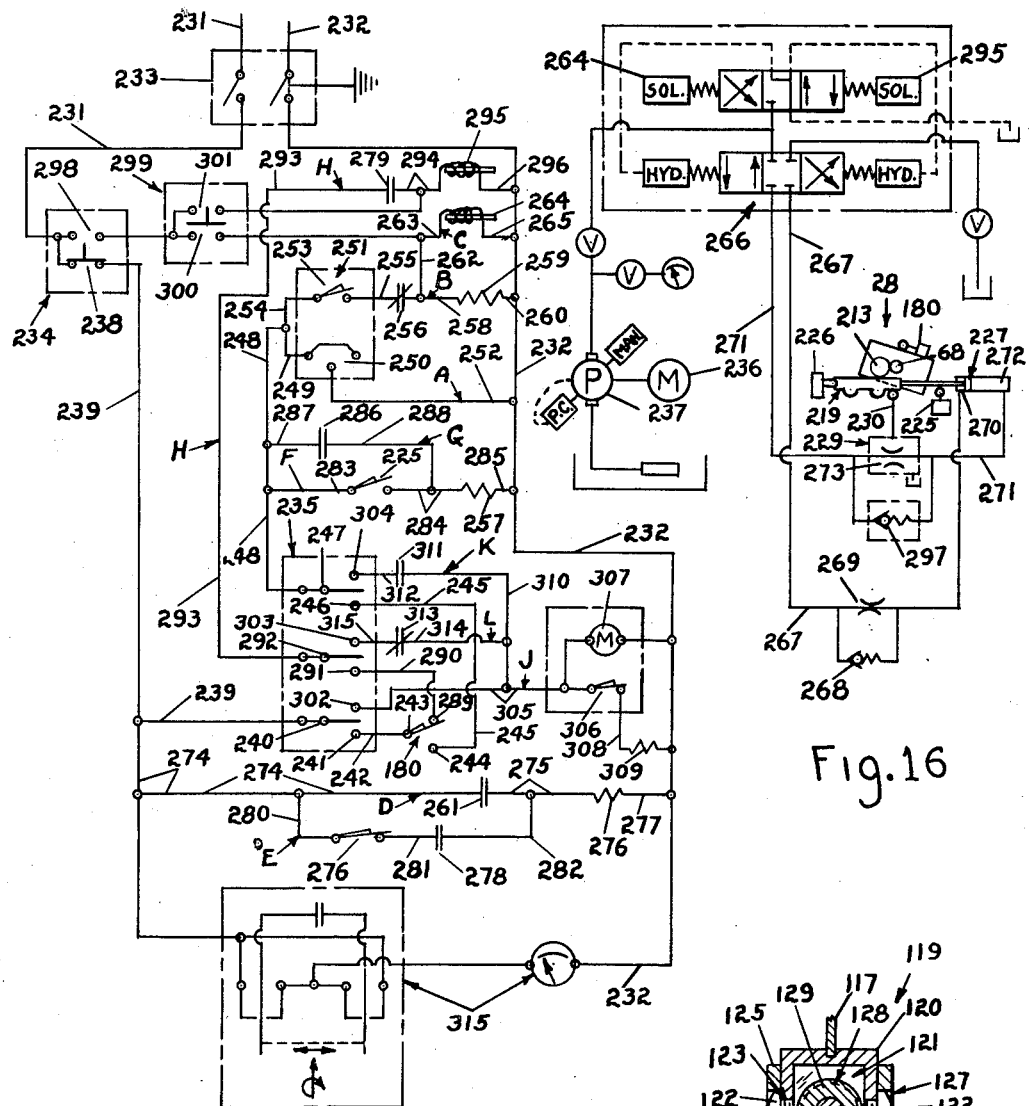
Fig. 15
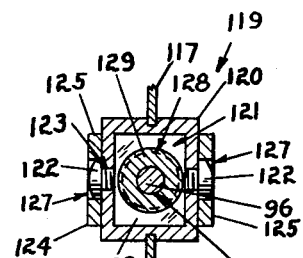
Fig. 12
Fig. 16
INVENTOR.
Carl B. Williams
BY
Nobbe & Swope
ATTORNEYS United States Patent Office 2,995,480
Patented Aug. 8, 1961

2,995,480
METHOD AND APPARATUS FOR PRESSING LAMINATED SAFETY GLASS
Carl B. Williams, Toledo, Ohio, assignor to Libbey-Owens-Ford Glass Company, Toledo, Ohio, a corporation of Ohio
Filed Oct. 7, 1957, Ser. No. 688,503
8 Claims. (Cl. 154—2.7)

This invention relates broadly to the pressing of laminated sheets such as of glass and plastic, plastics or like materials. More particularly, the invention has to do with an improved method and apparatus for pressing together laminations of glass sheets and an interlayer of plastic in an operation that is preliminary to the final pressing of the same by heat and pressure in an autoclave.

In the manufacture of so-called laminated safety glass sheets, it is well-known that a composite structure or "sandwich" of two or more glass sheets and an interposed layer of a non-brittle thermoplastic are initially pressed together to expel entrained air; to assure surface contact between the opposed layers, and to seal the marginal edges. This preliminary pressing, or so-called "pressing" operation is usually performed in order that during the final sealing within an autoclave, employing heated oil under pressure, the fluid will not penetrate at the edges of the laminated sandwich.

The pressing of flat and even slightly curved glass sheets ordinarily presents no unusual problem since the laminated sandwiches can be handled on substantially horizontally disposed conveyors leading to and away from the supporting structure of the pressing rolls. Where, however, the glass sheets are bent to curvatures of a more complex character, means must be devised to so support the glass-plastic sandwiches in carrying them forwardly that the leading areas thereof can be satisfactorily entered into and passed between the pressing rolls. In some instances, this has been accomplished in the prior art by orienting the pair of rolls in an angular plane; however, in such prior art structures, any modifying change to accommodate bent glass sheets of different curvatures or even flat glass has required rather extensive alterations in the apparatus and a comparatively lengthy interruption of the production line in which it is situated. Furthermore, such roll displacement in a fixed angular plane results in excessive breakage when pressing complexly curved glass-plastic laminates.

We have discovered that the glass sheets, whether flat or curved, can be initially supported and conveyed to the pressing rolls on a moving support that may be operated in a horizontal position or may be manually preset at a downwardly inclined angle, whichever position is appropriate for the curvature of the sheets being processed, to provide for a satisfactory entrance of the lead edge of each sheet between the pressing rolls. Further, it has been found that, locating a roller at a preselected distance from the pressing rolls assists in the entry of the sandwich therebetween and that by providing means for varying this distance from the pressing rolls, the apparatus can be readily adapted to process sandwiches having wide variations in degree of curvature. This roller thus becomes a focal point in the path of movement and, by changing its relation to the moving support and to the pressing rolls, the entire character of any operation can be instantly affected. Otherwise stated, when departure is made from the processing of a flat or a bent glass sandwich of one curvature to a bent glass of a different curvature, an alteration in the angle of inclination of the entrance conveyor and in the location of the entrance roller compensates for the curvature change of the sandwich to provide proper entry into the pressing rolls and in addition the conveyor supports the trailing end of the sandwich while pressing the leading edge thereby minimizing breakage of the sandwich.

In other words, the invention provides an entrance conveyor that is pivoted at its lead edge so that it may be operated in a horizontal position for flat glass sandwiches or in a downwardly inclined position for curved glass sandwiches, the degree of inclination being commensurate with the degree of curvature of the sandwiches being processed at any particular time. Likewise, the location of the entrance roller is adjustable vertically and horizontally to assume a position which will accurately and repeatedly guide the leading edge of either flat or curved glass-plastic sandwiches into the pressing rolls.

Additionally, according to the invention there is provided a pressing roll assembly or cage pivotally mounted on a horizontal axis for arcuate movement. When processing flat sandwiches, the cage is positioned with the longitudinally disposed axes of the pressing rolls in vertical alignment, one above the other, and with the contacting tangent points of the rolls in horizontal alignment with the upper flights of the then horizontally disposed entrance and exit conveyors. When processing curved sandwiches, the cage is cyclically pivoted in an arc from sandwich receiving position to sandwich discharging position and returned to receiving position. During the pivoting of the cage from receiving to discharge positions, the rate of movement of the cage is accelerated and decelerated by mechanicohydraulic means in such a manner that the axes of the pressing rolls are at all times substantially normal to the opposed surfaces of the sandwich which are in contact with the rolls at any instant. Thus, the arcuate movement of the pressing roll cage is accelerated when the rolls move from a flat surface of a sandwich to a curved surface and decelerated when the rolls again move to a flat surface. In pressing the so-called "panoramic" windshield for automobiles or similar complexly curved glass-plastic sandwiches the rate of arcuate movement of the cage while pressing progresses from the roll angle that is normal to the approaching lead edge of the sandwich, accelerates rapidly at the relatively sharp corner curve, decelerates rapidly and moves slowly while the rolls are pressing the long sweeping curve of the central section, again accelerates rapidly for pressing the other corner curve and decelerates rapidly and moves slowly while pressing the terminal end. The variations in the rate of arcuate movement of the cage during the pressing operation is correlated with the contour of the sandwich to assure that the angle defined by the surfaces of the sandwich and a line passing through the axes of the pressing rolls closely approximates 90°. At this point the cage generally has completed its motion and, when the trailing end of the sandwich is free of the cage, the cage is rapidly reversed to its initial or sandwich receiving position.

As will be hereinafter disclosed the length of the arc included in the cycling of the cage may vary from 0 to 180°, the rate of movement may be varied within that arc from zero to maximum and the timing of any acceleration or deceleration of that movement within the arc is preselected, all conforming to the varying degrees of curvature of the sandwiches being processed.

After more than one-half of the sandwich has been pressed, the lead portion of the sandwich contacts the horizontally disposed top flight of an exit conveyor, which is pivotally supported at the end remote from the pressing roll cage and is counterweighted so that the end adjacent the cage will swing downwardly under the weight of the sandwich and as the sandwich advances on the exit conveyor and is freed of the pressing rolls, the conveyor returns to a horizontal position to feed the prepressed sandwich into a conveyorized oven and thence into one or more identical prepress mechanisms to complete the pressing operation. Thereafter the pressed sandwich is placed in an autoclave wherein the bonding of the glass to the plastic is completed.

It is therefore an object of this invention to provide an improved apparatus for pressing laminated safety glass, employing a pair of horizontally disposed pressing rolls rotatably supported on spaced, parallel axes in a cage, which cage is pivotally mounted on an axis, controls for arcuately pivoting the cage about the cage axis to maintain the pressing roll axes in a plane that is normal to the surfaces of the sandwich being contacted by the rolls, and tiltable entrance and exist conveyors to provide a normal entry and exit of the sandwich to and from said pressing rolls.

A second object of the invention provides an improved apparatus for pressing laminated safety glass, employing a pair of horizontally disposed pressing rolls rotatably supported on spaced parallel axes in a cage which is pivotally mounted on an axis, cyclical controls, initially activated by the lead edge of the sandwich as it emerges from between the rolls, for arcuately pivoting the cage about its axis to maintain the axes of the pressing rolls in a plane that is normal to the surfaces of the sandwich being contacted by the rolls, said controls, subsequent to the passage of the sandwich through the rolls, initiating a reversal of the cage about its axis to return the cage to its starting or sandwich receiving position.

Another object of this invention is to provide an improved apparatus for pressing laminated safety glass as described above, wherein the apparatus and controls may be readily modified for pressing flat laminates or laminates having a different curvature from previously processed laminates.

Another object of this invention is to provide an improved method and novel apparatus for pressing laminated safety glass as described above, wherein the included angle of pivot, the rate of pivotal motion and the timing of the rate of pivotal motion of the cage are correlated so that a line connecting the horizontally disposed axes of the pressing rolls is at all times during the pressing operation substantially normal to the surfaces of the sandwich at the point of roll contact.

Another object of this invention is to provide an improved method and novel apparatus for pressing laminated safety glass, wherein a pressing roll cage is pivotally mounted on an axis lying in a plane with the top flights of the entrance and the exit conveyors when in horizontal position, a pair of horizontally disposed pressing rolls each comprised of pairs of rollers which are rotatably mounted on common axes lying parallel to and spaced from the cage axis and with all of said axes lying in the same plane, and yieldable means connecting opposed pairs of rollers thereby enabling opposed pairs to rise and fall in unison in a plane substantially normal to the cage axis while maintaining a tangential pressing force on opposed surfaces of the sandwich.

These and other objects and advantages of the invention will become apparent during the course of the following description when read in conjunction with the accompanying drawings.

In the drawings wherein like numerals are employed to designate like parts throughout the same:

FIG. 1 is a perspective illustration of one form of curved laminated safety glass treated by the method and apparatus disclosed herein;

FIG. 2 is a simplified side elevation view of the pressing apparatus of the invention;

FIG. 3 is a plan view of the pressing apparatus including entrance and exit conveyors;

FIG. 4 is a side elevation view of the apparatus of FIG. 3 as viewed from the bottom thereof;

FIG. 5 is an enlarged view of the pressing apparatus as viewed from the exit side;

FIG. 6 is another view of the pressing apparatus with parts in section as seen from the bottom of FIG. 5;

FIG. 7 is still another view of the pressing apparatus as seen from the top of FIG. 5;

FIG. 8 is a cross sectional view of the pressing apparatus taken along the line 8—8 of FIG. 7;

FIG. 9 is a detailed sectional view of a pair of lower pressing rollers taken along the line 9—9 of FIG. 8;

FIG. 10 is a detailed sectional view of an upper pair of pressing rollers taken along the line 10—10 of FIG. 8;

FIG. 11 is an enlarged sectional view of a lower pressing roll tensioning linkage taken along the line 11—11 of FIG. 5;

FIG. 12 is a section of the linkage shown in FIG. 11 taken along the line 12—12;

FIG. 13 is a detailed sectional view of a resilient followup support mechanism for opposed pairs of pressing rollers and is taken on the line 13—13 of FIG. 5;

FIG. 14 is an enlarged sectional view of an upper pressing roll tensioning linkage taken along the line 14—14 of FIG. 5;

FIG. 15 is a schematic diagram of the electrical control circuit; and

FIG. 16 is a schematic diagram of the hydraulic circuit, which in conjunction with the electrical circuit of FIG. 15 synchronizes the pivotal motion of the pressing roller cage with the surface contour of the sandwich and returns the cage to its initial position.

In manufacturing laminated safety glass, it is common practice to pair sheets of glass prior to assembly to minimize optical aberrations in the laminated products. In flat glass laminates the pairing can be done at any time prior to assembly of the two sheets of glass with the non-brittle thermoplastic interlayer, while in fabricating curved glass laminates the pairing takes place immediately prior to the bending operation. Once paired, however, the sheets travel together till they are permanently bonded to the plastic interlayer. First, the paired sheets are assembled with the plastic interlayer in an air conditioned room to minimize the opportunity for contamination of the surfaces to be bonded, then deposited on the prepress entrance conveyor and fed between a first pair of pressing rolls to expel air from between the layers and to secure a light but continuous bond of the plastic to the glass. Next, the bonded laminate is passed through an oven and the pressing is repeated to reinforce the bond, particularly at the edges, while the plastic is in a softened and adhesive condition. Thereafter, the sandwich is placed in a container for final bonding of the layers in an autoclave.

The method and apparatus disclosed herein is particularly adapted to economical large volume production as required by the automotive industry and with minor changes and adjustments can be readily changed for succeeding production runs of laminates having a different curvature. The apparatus is being successfully employed to process flat laminates and the "panoramic" windshields, which windshields have a combination of sharp and long sweeping bends.

The entrance of the sandwich is, in all cases, guided by the entrance conveyor and the entrance roller into the pressing rolls so that the surfaces of the glass are normal to a line passing through the axes of the pressing rolls. When flat glass sandwiches are being pressed, the axes of the pressing rolls are set in a vertical plane and the hydraulic system for pivoting the pressing roll cage is immobilized, the entrance conveyor is moved into a horizontal position and the entrance guide roller is raised so that the top is flush with the top flight of the entrance conveyor. The top flight of the conveyor and the guide roller are now in horizontal alignment with the contacting surfaces of the opposed pressing rolls. When curved glass sandwiches are being pressed the hydraulic system is placed in operative condition, the control cam corresponding to the curvature of the sandwich is attached to the rack, the projections for operating the limit switches are properly positioned, the entrance conveyor and entrance roll are adjusted in relation to the longitudinal size and the curvature of the sandwich. These changes may be made rapidly and the only additional apparatus required is a cam for each new style of curved glass. Since the runs are in substantial volume, the change-over time and the cost of the cam, on a per piece basis, are insignificant.

As the curved sandwich passes between the pressing rolls, the controls are energized by the sandwich to initiate cycling of the cage movement. The roll cage pivots about its axis carrying the sandwich with it and as the leading edge of the sandwich engages the top flight of the exit conveyor, that conveyor pivots at the far end. The exit conveyor is counterbalanced so that as the laminated sandwich clears the pressing rolls and advances on the conveyor, the conveyor moves gently upward to a horizontal position.

Simultaneously with the upward motion of the exit conveyor, the controls cycle automatically to reverse the arcuate motion of the pressing roll cage and restore it to its sandwich receiving position.

Referring to FIG. 1 of the drawings, the numeral 20 designates one form of curved, laminated safety glass which is pressed in the apparatus disclosed herein and comprises two sheets of bent glass 21 and 22 bonded to a plastic interlayer 23. In the form shown, the glass is only bent about axes transverse to the long dimension. The central section A is a long sweeping curve which blends at both ends into a sharp bend B which in turn flows into a relatively short flat terminal section C.

FIG. 2 illustrates schematically the progressive pressing operation, starting in an air conditioned room 24, where the sandwich comprised of the two glass sheets and the plastic interlayer, is assembled and which room is equipped with a conveyor 25 for transporting the sandwich through a slot 26 in the wall of the room and depositing it on the prepress entrance conveyor 27, which in this instance is inclined downwardly to lead the sandwich into the pressing roll cage 28. The cage, in receiving position, is inclined to the left of its vertical center line (FIGS. 2 and 4). The sandwich is gripped between the pressing rolls and is moved forward by the rolls as the cage rotates clockwise, as viewed at the right in FIG. 2. The initially pressed sandwich is deposited by the pressing roll cage 28 onto the exit conveyor 29 which dips downwardly under the weight of the sandwich and then rises as the sandwich is advanced thereon, as previously described. The sandwich passes from the exit conveyor 29 onto a conveyor 30 which carries the sandwich through an oven 31 wherein the sandwich is heated till the plastic interlayer becomes tacky and deposits the sandwich onto a second entrance conveyor 27 to repeat the pressing operation by passing the sandwich through a second pressing cage 28 and thence onto a second exit conveyor 29. The sandwich is now firmly pressed together with all the air squeezed from between the layers and with a light but continuous bond established between the glass and the plastic. Thereafter, a plurality of the bonded sandwiches are deposited on a rack which is subsequently placed in an autoclave, wherein the bond is made permanent by the application of heat and pressure.

Referring particularly to FIGS. 3 and 4 of the drawings, the entrance conveyor 27 is elevated above floor level on a frame, generally indicated by the numeral 32 and comprised of a rectangular channel base 33, four channels 34 rising at the corners and a top frame 35 made of two longitudinally extending channels fixed to the top end of the risers 34 directly above the longitudinal base channels. A pair of bearings 36 (FIG. 3) are bolted to the top of the leading edge of each channel 35 with the bores of the bearings in alignment to form pivots for an endless belt type conveyor, generally indicated by the numeral 37. The conveyor 37 is supported on a frame work 38 comprised of a pair of angles 39 held in spaced, parallel relation by cross members 40 spaced inwardly from the ends of the angles 39 and at the midpoint. Two pairs of bearings 41 (FIG. 3) are bolted to the top of the frame angles 39 at their extremities with each pair in axial alignment. A roller 42 is centered between the lead bearings 41 (to the left in FIGS. 3 and 4) on stub shafts 43 which extend through the associated pair of bearings 41 and bearings 36. A sprocket 44 is fixed to one of the stub shafts 43 to form a part of the conveyor driving system, which will be described in detail hereinafter. An idler belt roller 45 having stub shafts 46 extending into the remaining pair of bearings 41 at the far end of the conveyor frame work 38 cooperates with roller 42 to form a movable support for an endless web belt 47. Thus, it can readily be seen that the conveyor 37 is free to pivot around an axis formed by the shafts 43 and the associated bearings 41 and the top flight of the belt is adapted to be advanced in the direction indicated by the arrow (FIGS. 3 and 4), over rollers 42 and 45, mounted on shafts 43 and 46 respectively. A lever 48 is fulcrumed on an upright frame member 49 at 50 (FIG. 4), which fulcrum is approximately at the mid-point of the lever. A roller 51 is mounted for rotation on one end of the lever to engage the underside of the conveyor frame work 38 adjacent the idler belt roller 45. The lever 48 and associated roller 51 serve to raise and lower the end of the conveyor 37 within the limits of a locking member comprising a radial slot 52 formed in the upright 49 with the center being the fulcrum point 50 and a locking bolt and nut 53.

The pressing roll cage 28 is supported in bearings 54 on a frame 55 which is an extension of the entrance conveyor frame 32 and which is widened to provide pressing rolls the full width of the entrance conveyor frame 32, as shown particularly in FIG. 3. Referring to FIG. 4 an entrance roller 56 is mounted on the base of the frame 55 on a jack screw 57 for raising and lowering the entrance roller 56. A U-shaped yoke on top of the jack-screw carries notches 59 aligned in both legs of the yoke so that the entrance roller 56 may be moved longitudinally to provide a two-dimensional adjustment.

The pressing roller cage 28 is shown in detail in FIGS. 5 through 14, inclusive. A case 60, which is open on the entrance and exit sides 61 and 62 respectively, to permit passage of the sandwich, has a closed end section 63 adjacent the drive, another closed end section 64 at the opposite end, a closed side section 65 joining the end sections at the top of FIGS. 5 and 8, and a second closed side section 66 joining the end sections at the bottom of FIGS. 5 and 8. A hollow stub shaft 67 projects from the inner face of the case end section 63 on the centerlines thereof through the adjacent bearings 54. The shaft 67 carries a spur gear 68 adjacent the inner face of the bearing, the functioning of which will be described in conjunction with the control section of this disclosure. The other end section 64 of the case 60 is centrally supported for rotation by a solid stub shaft 69 journaled in the other bearing 54.

A line shaft 70 (FIG. 6) extends through the hollow stub shaft 67, is supported for rotation in bearings 71, carries a sprocket 72 on the reduced outer end and another sprocket 73 on the opposite end inside the case 60. The functioning of the sprocket 72 will be described in connection with the driving mechanism for the pressing rolls. The sprocket 73 is operably connected by a chain 74 to a sprocket 75 fastened to a shaft 76 which is supported in bearings 77 and 78 on opposite sides of and adjacent the sprocket 75 and in other suitable bearings and support 79 projecting from the case 60 on the sandwich entrance side 61 and near the bottom thereof as viewed in FIG. 6. A plurality of paired pressing rollers 80, each pair pivotally mounted in juxtaposition on the shaft 76, combine to form an elongated driven pressing roll 81 (FIG. 5).

The lower pressing rollers 80, as shown in detail in FIGS. 8 and 9, are comprised of a bifurcated yoke 82 extending into the case 60 to support a stationary shaft 83 on screws 84 extending through the legs of the yoke and into opposite ends of the shaft, a bearing 85 on each end of the shaft, and a pair of cylindrical rolls 86 each having a resilient outer surface 87 on a hollow metal core 88 are supported in spaced relation by the shaft 83 and bearings 85. A sprocket 89 is inserted on the shaft 83 in the space between the rolls 86 and the sprocket and the rolls are fastened together by screws 90 passing through the cores 88 of the rolls and the sprocket 89. A chain 91 connects the sprocket 89 with a sprocket 92 fixed to the shaft 76. The chain 91 is tensioned by an idler sprocket 93 in the usual manner. Spacers 94 are placed over the shaft 76 between the yokes 82. A rod 96 (FIGS. 5 and 8) is pivotally joined to the yoke 82 by a pin 97 extending through bosses 98 projecting from the periphery of the bifurcated yoke 82 and the rod extends outwardly therefrom through a hole in the side section 66 of the case 60. The function of the rod 96 will be discussed fully in conjunction with the followup mechanism which joins opposed pairs of pressing rollers.

The opposed elongated pressing roll 99 is frictionally driven by contact with the driven roll 81 or by the top surface of an interposed sandwich. Referring particularly to FIGS. 8 and 10, a plurality of double pressing rollers, generally indicated by the numeral 100, are pivotally supported by a bracket 101 on a shaft 102 lying parallel to and above the shaft 76 in the upper part of the entrance opening 61 (FIG. 8). The shaft 102 is journaled in projections 103 (FIG. 5) on the case 60. As shown in FIG. 10, the rollers 104 are made of a resilient shell 105 over a cylindrical metal core 106 having an inwardly extending annular shoulder 107 formed on the inner face and adapted to grip the inner race of a bearing 108 when the two rollers 104 are fastened by screws 109. The outer race of the bearing is clamped in a split section of the bracket 101. A rod 110 (FIGS. 5 and 8) is pivotally connected at 111 to the bracket 101 and extends through a hole in the side section 65 of the case 60. A connecting rod 112 is threaded at the upper end thereof, as indicated at 113, and is pivotally connected to the rod 110 by a pin 114. Rod 112 will be connected to the follow-up mechanism and will be described further at that time.

In the normal position of the paired, opposed pressing rollers 80 and 100, as shown in FIG. 8, the vertical centerlines of the rollers 80 and 100 and the pivot pins 97, 111 and 114 lie in the same plane. Spacers 115 (FIGS. 5 and 10) and the brackets 101 serve to position each of the rollers 100 in alignment with its opposing roller 80.

Referring to FIGS. 5, 6, 7, 8 and 11 through 14, the follow-up mechanism for each opposed pair of rollers 80 and 100 is generally indicated by the numeral 116. The mechanisms for each pair of rollers are, for all practical purposes, identical in construction, therefore the following description of one of the mechanisms will be considered applicable to all the rollers. The follow-up mechanism is basically in the form of a parallelogram with pivots at the four corners. A lever arm 117 is pivotally mounted in a bifurcated bracket 118 substantially parallel with the outside wall 66 of the case 60 and lies diagonally with respect to the longitudinal axis of the case. The lever arm 117 terminates in one side of a pressing roll tensioning device 119, shown in detail in FIGS. 6, 8, 11 and 12. The tensioning device 119 consists of a rectangular block 120 having a rectangular opening 121 extending vertically therethrough and screws 122 entering aligned threaded holes 123 in the sides of the block with their heads projecting outwardly. A yoke 124, comprised of side plates 125 and a rectangular cross piece 126 joining the side plates at the bottom, has holes 127, near the stop of the side plates in which the heads of the screws 122 are pivoted. The cross piece 126 is centrally threaded as at 128 to receive an adjusting screw 129 which has a blind axially aligned bore 130 entering from the top in which the rod 96 of the associated pressing roll assembly 80 is bottomed. A set screw 131 extends through one side of the yoke 124 near the bottom thereof to hold the adjusting screw 129 against rotation. A second lever arm 132 is welded to the other end of block 120, passes through a slotted guide 134 which is fastened to the wall 66 of the case 60, and terminates in a bifurcated yoke 135. The arm 132 and the yoke 135 are pivoted on a pin 136. The apparatus described above will hereinafter be referred to as the lower pressing roll tensioning apparatus and designated generally by the numeral 137.

A rod 138 rigidly connects the lower pressing roll tensioning apparatus 137 to the upper pressing roll tensioning apparatus 139 with the rod 138 extending from the yoke 135 to a similar yoke 140 on the upper tensioning apparatus. As shown in FIG. 7, a lever arm 141 is pivotally engaged by a pin 142 which extends through the yoke 140 and the lever arm 141. The lever arm 141 passes through a guide 143 mounted on the wall 65 and terminates in a yieldable support mechanism 144 for opposed lower and upper pressing rollers 80 and 100 respectively. Referring particularly to FIG. 13, the support mechanism 144, consists of a block 145 having a rectangular opening 146 extending vertically therethrough and a pair of pivot pins 147 extending laterally into openings 148 drilled in aligned relation in the depending sides 149 of an inverted stirrup member 150. The sides 149 of the stirrup 150 are joined near the top by a cross piece 151 having a threaded bore 152 in axial alignment with the opening 146 of the block 145. An externally and internally threaded sleeve 153 is held in the bore 152 by a set screw 154 extending through a threaded hole 155 to bear against the outer surface of the sleeve. A rod 156 is threaded on the upper end to engage the internal threads of the sleeve 153 and has a reduced diameter 157 at the lower end which end is loosely received in an opening 158 in the wall 65 of the case 60. A shoulder 159, formed by the reduction in diameter of the rod 156, rests on the top of a spring seat 160 which rests in a spherical depression 161 circumscribing the opening 158. A washer 162 is seated against the lower end of the sleeve 153 around the rod 156, and a compression spring 163 is interposed between the washer 162 and the spring seat 160.

As is shown in FIGS. 5, 6, 7 and 14, a tensioning device 164 for the top pressing rolls 100 is pivotally mounted on screws 165 having their heads projecting beyond the surface of the block 145, which was described in relation to the yieldable support mechanism 144. An inverted U-shaped member 166 is comprised of side members 167, having holes 168 in horizontal alignment to receive the heads of the screws 165, the side members 167 are joined at the top by a plug 169 that is internally threaded to receive an internally and externally threaded nut 170 which in turn receives the threaded upper end 113 of the rod 112. A set screw 171 locks the nut 170 against rotation. Another lever arm 172 is welded to the far end of the block 145 and terminates in a bifurcated bracket 173 on the side section 65 of the case 60 where it is pivotally held by a pin 174 passing through aligned holes in the legs of the bracket 173 and the end of the lever arm 172. Thus, by properly adjusting the rod 156 and the sleeve 153 of the support mechanism 144 (FIG. 13), the tangent contact point of each pair of pressing rollers 80 and 100 may be raised or lowered into the plane of the top flight of the entrance and exit conveyors 27 and 29 when the conveyors are in horizontal position, or slightly above or below that plane if the character of the sandwich warrants so positioning the rolls. The spring 163 provides for self-alignment to correct for minor deflections of the tangent point from that plane, due either to human error or to slight variations in the transverse surfaces of the sandwich. Further, planar adjustment of the pressing rolls 80 and 100 and tensioning therebetween may be accomplished by manipulating the lower and upper tensioning devices 119 and 164 (FIG. 8).

Referring to FIGS. 5 and 8, an elongated roller 175 is mounted on a stationary shaft 176 disposed parallel to the axes of the pressing rolls 81 and 99. The stationary shaft 176 is pivoted on a shaft 177 extending the length of the cage 60 and which shaft 177 is journaled at its ends in bearings 178 carried by the end sections 63 and 64 of the cage. The roller 175 is adapted to be engaged by a sandwich as it emerges from between the pressing rolls and to be moved counterclockwise as viewed in FIG. 8. A cam 179 is secured to one end of the pivot shaft 177 and is adapted to shift the contacts of an entrance or cycle initiating switch 180 upon counterclockwise movement of the roller 175 and the cam 179. A counterbalance 181 (FIG. 8) on the shaft 177, closes the entrance switch 180 when the roll 175 is not displaced by a sandwich. The switch 180 is fastened to the end wall 63 of the cage 60 on the exit side 62. The detailed operation initiated by closing switch 180 will be described later.

Referring now to FIGS. 3 and 4, the exit conveyor 29 is elevated on a frame 182 upon which a motor driven belt type conveyor 183 is pivotally mounted on a roller shaft 184 and bearings 185 on the frame 182 at the end remote from the pressing cage 28. A conveyor support framework 186 is pivotally mounted in bearings 187 on the roller shaft 184 adjacent the inner face of the frame mounted bearings 185. A second set of bearings 187 is carried on the upper face of the framework 186 and receives an idler roll shaft 188. A continuous web belt 189 is moved by the rolls 184 and 188 to convey the pressed sandwich away from the pressing cage 28. The exit conveyor 183 is provided with a counterweight 190 comprised of linkages 191 pivotally attached to the underside of the framework 186 at 192 and to the exit conveyor frame 182 at 193 with weights 194 at the end of the linkages remote from the pivot point 192 on the conveyor framework. Thus, by attaching a number of weights 194 proportionate to the weight of the sandwich, the conveyor 183 will pivot downwardly about the shaft 184 and associated bearings 187 as a curved sandwich emerges from the cage 28 and contacts the top flight of the conveyor. The conveyor will rise to a horizontal position as the sandwich is advanced to a point where the trailing edge of the sandwich clears the cage.

Power to drive the entrance conveyor 27, the elongated pressing rolls 81 and 99 the former directly and the latter by friction, and the exit conveyor 183 is supplied through a variable speed motor 195 having an output shaft 196 which carries a pair of sprockets 197. The motor 195 and a jackshaft 198, the latter carrying sprockets 199 (FIG. 3), are mounted on the exit conveyor frame 182 below the web belt 189. A pair of chains 200 engage the sprockets 197 and 199 to rotate the jackshaft 198 in a clockwise direction as viewed in FIG. 4. An additional pair of sprockets 201 (FIG. 3) are carried by the jackshaft 198. A second jackshaft 202 is journaled for rotation in bearings 203 on the entrance conveyor frame 32 below the leading end of the belt 47 and carries a pair of sprockets 204 which are advanced in a clockwise direction, as viewed in FIG. 3, by chains 205 and sprockets 201. Numerous support and take-up sprockets prevent excessive sagging of the chains 205. Another sprocket 206 is carried by the jackshaft 202 outside the frame 32 and is connected by a chain 207 to the sprocket 44 which is rotated in a clockwise direction as viewed in FIG. 4 and advances the top flight of the belt 47 toward the prepress cage 28. The exit conveyor 183 is driven through a sprocket 208 (FIG. 3) mounted for rotation on the jackshaft 198, and through a chain 209 to a sprocket 210 mounted on the roller shaft 184 outside the exit conveyor frame 182. Conventional means are provided to properly tension the chain 209. Still another sprocket 211 is mounted on the jackshaft 198 and supplies power to the lower pressing rollers 80 through chain 212, sprocket 72 mounted on shaft 70 (FIGS. 5, 6 and 7), sprocket 73 (FIG. 6), chain 74, sprocket 75, sprockets 92 (FIGS. 6, 8 and 9), chains 91 and sprockets 89 (FIGS. 8 and 9).

As viewed in FIG. 8, the pressing rollers 80 are each driven counterclockwise at a synchronized speed and frictionally engage and rotate the upper opposed pressing rollers 100 in a clockwise direction when a sandwich is not interposed. When a sandwich is interposed between the rollers 80 and 100, the rollers 100 are individually rotated in the same direction by contact with the top surface of the sandwich.

The power and control mechanisms for cyclically moving the pressing roll cage 28 back and forth in an arcuate path, subject to the entrance of a sandwich into the cage, is shown in FIGS. 3, 4, 8, 15 and 16. A pair of spur gears 213 and 214 are mounted on a shaft 215 which is journaled in a bearing 216 on the pressing roll cage frame 55. The gear 213 is in mesh with the large spur gear 68 on the hollow stub shaft 67 which shaft 67 is fastened to the case 60 (FIGS. 5, 6 and 7). A guard 217 is attached to the frame 55 in position to extend over the gears 213 and 214. The gear 214 is in mesh with a rack 218 fastened to the top of a plate cam 219, which cam is adapted to be moved longitudinally of the frame 55 on ways 220. The lower edge 221 of the cam 219 is machined to correspond with the curvature of the sandwiches being pressed. A pair of projections 222 and 223 (FIG. 4) are mounted in longitudinally extending ways 224 (FIG. 4) on the front face of the cam 219 below the rack 218 in a position to respectively operate the cage forward motion limit switch 225 and the cage return motion limit switch 226 which depend from the gear guard 217. The forward and return limit switches 225 and 226 correlate the magnitude of the arc transcribed by the pressing roll cage 28 to the developed length and to the curvature characteristics of the sandwich. A double acting hydraulic cylinder 227 is attached to the side of the frame 55 and its plunger rod 228 is attached to one end of the cam 219. A hydraulic flow control valve 229 having an operating plunger 230 (FIG. 16), is attached to the side of the frame 55 with the plunger in contact with the lower edge 221 of the cam 219.

The electrical and hydraulic systems controlling the cycling of the arcuate movement of the pressing roll cage are diagrammatically shown in FIGS. 15 and 16. The numerals 231 and 232 designate the electrical mainlines which are shown interrupted by a master switch 233. A selector switch 234 is shown in position for automatic operation, when reversed the control becomes manual.

To energize the controls for automatic cycling of the pressing roll cage 28, the master switch 233 is closed, selector 234 switch is placed in automatic position as shown and the drum switch 235 is shifted to close the lower contacts. In addition, the electric motor 236 is energized (power circuit not shown) to start the pump 237 and pressurize the hydraulic system. The motor 195 (FIGS. 3 and 4) is also energized to power the entrance conveyor 27, the pressing rolls 81 and 99, and the exit conveyor 29.

As the leading edge of a sandwich passes through the pressing rolls 81 and 99 it contacts the roll 175 to rotate shaft 177 and the cam 179 to shift the contacts of the entrance switch 180, as previously described. The shifting of the contacts of switch 180 establishes, Circuit A from the main 231 through contacts 238 of selector switch 234, line 239, contacts 240—241 of drum switch 235, line 242, contacts 243—244 of the cycle initiating switch, line 245, contact 246—247 of the drum switch 235, lines 248 and 249, interval timer 250 of the time delay mechanism 251, and line 252 to the other main 232.

After a time delay of approximately .2 of a second, the interval of which may be varied dependent upon the character of the sandwich curvature, circuit B is completed by the closing of switch 253 of the time delay mechanism 251 to extend the circuit from the line 248 through the line 254, switch 253, line 255, the normally closed contacts 256 of the relay 257, line 258, relay coil 259 and line 260 to the main 232. The energization of relay coil 259 closes contacts 261 in circuit D which will be described hereinafter.

Circuit C is also completed upon the closure of switch 253 of the time delay mechanism 251 and extends from line 258 through lines 262 and 263, solenoid coil 264 and line 265 to main 232. The energized solenoid coil 264 shifts a hydraulic valve 266 (FIGS. 4 and 16) to apply pressure through a pipe 267 and a ball check type by-pass 268 around a restricted orifice 269 to the head end 270 of the cylinder 227. The return line 271 from the tail end 272 of the cylinder 227 is restricted by a variable orifice 273 in the flow control valve 229 to vary the rate of forward arcuate travel of the pressing roll cage 28, as previously described. Any downwardly extending protuberances on the lower edge 221 of the cam 219 (FIGS. 3 and 16) will reduce the restriction through the orifice 273 and any upwardly extending recessions will increase the restriction, to respectively accelerate and decelerate the rate of arcuate movement of the pressing roll cage 28 to correspond with that transverse section of the sandwich surface being pressed at that particular moment.

The energizing of relay 259 is circuit B above, establishes,

Circuit D from line 239 through line 274, contacts 261 of relay 259, line 275, relay coil 276 and line 277 to main 232. The energization of relay coil 276 closes contacts 278 and 279 in circuits E and H, respectively, to be subsequently described.

Circuit E constitutes a holding circuit for circuit D around the relay contacts 261 and extends from line 274 through line 280, switch 226 line 281, closed contacts 278, and line 282 to a juncture with line 275. Switch 226 is opened only when the cam 219 has returned to its initial or sandwich receiving position (FIG. 4).

When the cam 219, and in particular the projection 222 carried thereby, advances to close the forward motion limit switch 225, Circuit F is completed from line 248 through line 283, switch 225, line 284, relay coil 257 and line 285 to main 232. The energization of relay coil 257 opens contacts 256 to interrupt circuits B, C and D and solenoid 264 is deenergized, which permits a spring or other means to shift valve 266 into a neutral position. Shifting of the valve 266 to neutral position, immobilizes the pressing roll cage 28 in preparation for the return stroke of the cylinder plunger rod 228. Simultaneously with the interruption of circuits B, C and D relay coil 257 closes another set of contacts 286 to establish, Circuit G from line 248 through line 287, contacts 286, line 288 to juncture with line 284, thus forming a holding circuit for circuit F around the forward motion limit switch 225.

As the sandwich clears the pressing rolls 81 and 99, pressure is relieved on the entrance switch 180 which moves it to the FIG. 15 position wherein contacts 243—289 are closed to establish circuit H described below. Reversal of the switch 180 also deenergizes circuits A and G and the time delay mechanism 251 is restored to its original position witch switch 253 opened. Further, contacts 256 and 286 of relay 257 are respectively released to closed and opened positions.

Circuit H extends from contacts 243—289 of entry switch 180 through line 290, contacts 291—292 of the drum switch 235, line 293, contacts 279 of relay 276 (held closed by circuit E), line 294, solenoid coil 295 and line 296 to the main 232.

Solenoid 295 shifts the hydraulic valve 266 to pressurize the pipe 271 and the tail end 272 of the hydraulic cylinder 227 through a ball check type by-pass 297 around the flow control valve orifice 273. The return from the head end 270 of the cylinder 227 through the pipe 267 and the orifice 269, is restricted only an amount sufficient to cushion, but not to unduly retard, the return motion of the cage 28.

As the motion of cam 219 is reversed, the forward motion limit switch 225 is opened to break Circuit F and when the cam 219 reaches the predetermined limit of the reverse travel, the projection 223 on the cam 219 reopens the cage return motion limit switch 226 to deenergize circuit E and relay coil 276, thereby opening contacts 279 and breaking circuit H. The solenoid 295 shifts the valve 266 to a neutral position and the pressing roll cage is at rest in its sandwich receiving position.

For manual operation, the selector switch 234 is reversed to open contacts 238 and to close a second set of contacts 298. A second selector switch 299 can be shifted manually from the "off" position shown to close contacts 300 and thereby energize circuit C described above for forward motion of the cage 28, thereafter moved to "off" position to halt the forward motion, and finally moved to close contacts 301 for reverse motion of the cage as described in circuit H above. The sequence, used merely as an illustration above, may be altered to suit prevailing circumstances.

An important factor in the proper functioning of the prepress is that the pressing roll cage forward motion must be synchronized with the advancement of the sandwich through the pressing rolls. The variable orifice in the hydraulic system is carefully calibrated to accurately meter the fluid passed through, however, it is well known that a change in the temperature of the hydraulic fluid results in a change in the viscosity and the volume of fluid passing through the orifice. During prolonged interruptions in the pressing operation, the entrance switch 180 will not be actuated and the hydraulic fluid and the case remain static, resulting in a temperature drop of the fluid and a proportional increase in viscosity. Upon resumption of pressing the fluid is sluggish to the extent that the forward arcuate motion of the pressing roll cage lags behind the advancement of the sandwich through the pressing rolls resulting in excessive breakage.

To correct this condition, it has been found highly advantageous to introduce an automatic pressing roll cage recycling circuit which may be manually switched to periodically cycle the automatic controls, thereby moving the hydraulic fluid at regular intervals, thus maintaining a substantially constant temperature and viscosity of the fluid.

With the master switch 233 closed and contacts 238 of the selector switch 234 closed, the drum switch 235 is moved to engage the contacts 240, 292 and 247 with contacts 302, 303 and 304 respectively. The closing of contacts 240—302 establishes circuit J from line 239 through the contacts 240—302, line 305, switch 306 which is opened and closed periodically by a timer 307, line 308 and relay coil 309 to the main 232 and branch circuit K from line 305 through line 310, contacts 311 of relay 309, line 312, contacts 304—247 to join line 248 which energizes circuits A, B, C, D and E as described in the automatic operation above. At this time the cage 28 rocks forward under control of the cam 219 until the projection 222 closes the forward motion limit switch 225 to energize circuits F and G and to de-energize circuits B, C and D. The interruption of circuit C halts the forward motion of the cage 28.

The timer 307 opens switch 306, after a preselected interval to deenergize relay 309 thereby opening contacts 311 to deenergize circuits A, F and G. Simultaneously with the opening of contacts 311, the relay 309 closes another set of contacts 313 to establish circuit L extending from line 310 through line 314, contacts 313 of relay 309, line 315, and contacts 303—292 to a juncture with line 293 to energize circuit H for reversal of the cage motion. When the cage 28 returns to its initial position the projection 223 on the cam 219 opens switch 226 to halt the rearward motion of the cage. The opening of switch 226 deenergizes circuits E and H to restore the mechanism for another recycling. The timer 307 may be preset normally for varying intervals of closed and open condition of the switch 306 thereby enabling the operator to closely approximate the rate cycling while pressing sandwiches and thereby maintain the hydraulic fluid at a substantially constant viscosity. When pressing is resumed, the drum switch is reversed to engage contacts 240—241, 291—292 and 246—247 thereby disabling the recycling circuits J, K and L and restoring cycle initiating control to the entrance switch 180 upon the closing of contacts 243—244 by a sandwich, as previously described.

A tachometer, generally indicated by the numeral 315 (FIG. 15), is connected in a conventional manner to indicate the r.p.m. of the jackshaft 198 from which power is applied to the entrance conveyor 27, the pressing rolls 81 and 99 and the exit conveyor 29. The tachometer reading assists the operator in varying the output of the motor 195 through its shaft 196 to synchronize the forward motion of the sandwich with the arcuate motion of the cage. This ability to vary the motor speed permits the increasing of the rate of forward travel for flat or simply curved sandwiches, and also the decreasing of the rate of forward travel for complexly curved sandwiches, as well as permitting minor variations in the rate of forward travel of the sandwich to compensate for variation in the viscosity of the hydraulic fluid due to a change in the ambient temperature, replenishment or replacement of the hydraulic fluid, etc.

Briefly summarizing the operation of the apparatus disclosed herein, the two sheets of glass are assembled with a plastic interlayer in an air conditioned, dust free room, placed on a conveyor which passes the assembled sandwich through a slot in one wall of the room and onto the entrance conveyor of the prepress.

When flat glass is being run, the entrance conveyor and the exit conveyor of the prepress are placed in a horizontal position, the pressing roll axes are disposed in vertical alignment, one above the other, and with the contacting tangent points of the rolls in the horizontal plane defined by the upper flights of the entrance and exit conveyors. Furthermore, the hydraulic controls for arcuately moving the pressing rolls in forward and reverse directions are not cooperatively connected. With the apparatus arranged as above, the flat sandwiches move along the entrance conveyor, through the initial prepress to expel entrapped air from between the layers and to establish an air-tight bond therebetween, onto the exit conveyor, through an oven wherein the pressed assembly is heated till the plastic interlayer becomes tacky, through a second prepress for reinforcing the bond and finally are placed in an autoclave where heat and pressure are applied to intimately bond the glass sheets to the plastic interlayer.

When curved glass is being run the trailing edge of the entrance conveyor and the entrance roller are lowered, the control cam corresponding to the character of the sandwich curvature is installed on the ways, the forward and return motion limit switches are moved longitudinally in their ways to stop the pressing roller cage arcuate motion at points where a line joining the axes of the pressing rolls is respectively normal to the surface of the sandwich at the leading and trailing edges. Furthermore, the electrical and hydraulic systems are activated for automatic operation. With the apparatus conditioned as described, the laminated glass-plastic sheets pass from the assembly room into the forwardly declining entrance conveyor, are deflected upwardly by the entrance roller between the pressing rolls, and the leading edge of the sandwich, upon emergence from the pressing rolls, closes the entrance cycle initiating switch. The initial motion in the cage cycle pivots the pressing roll cage forward, with the rate of pivot determined by the rise and fall of the cam face and its throttling or opening of the hydraulic control valve. When the cam reaches a predetermined position which is coincident with the pressing of trailing edge of the sandwich a projection on the cam opens the forward motion limit switch to arrest the motion of the cage. As previously mentioned, the contour of the face of the cam is tailored to the curvature of the particular sandwich being pressed and its purpose is to maintain the plane passing through the pressing roll axes normal to the surfaces of the sandwich from the time of entry to the time of exit of the sandwich from between the pressing rolls. As the sandwich leaves the pressing rolls, the entry switch is released and is reversed by its counterweight to energize the rearward motion electrical and hydraulic systems, thereby returning the pressing roll cage to its initial position to receive another sandwich. The sandwich discharged from the pressing roll cage depresses the lead edge of the exit conveyor, which slowly rises to a horizontal position as the sandwich is advanced thereon sufficiently to clear the pressing roll cage. Thereafter, the sandwich is passed through the previously mentioned oven, through a second pressing operation and finally placed in an autoclave to complete the bond.

I claim:

1. In apparatus for pressing together sheets of a curved glass-plastic sandwich having a pair of pressing rolls arranged to provide a confined passage therebetween, means mounting the rolls for swinging same to dispose said confined passage in position to receive the leading end of a sandwich, and means for moving said sandwich in a path substantially transverse to an axis of curvature thereof and directing the leading end of said sandwich into said confined passage, the improvement comprising, means carried by the roll mounting means, for swinging the roll mounting means and the rolls about a fixed horizontal axis and automatic control means operatively connected to said last mentioned means for maintaining a substantially constant angular relationship between the plane through the axes of said rolls and the surface of said sandwich passing therethrough, said control means comprising a sliding cam, a cam follower and, rate varying means responsive to the movement of said cam follower and adapted to vary the rate of swinging of said rolls and roll mounting means about the fixed horizontal axis.

2. Apparatus for pressing sheets as in claim 1, in which actuating means responsive to the movement of said sheets through said confined passage are provided for initiating the operation of said control means.

3. Apparatus for pressing sheets as in claim 1, wherein said rate varying means comprises a double acting hydraulic cylinder, a piston operatively connected to said cam and said means mounting the rolls, and means for applying a pressurized fluid to said cylinder.

4. Apparatus for the preliminary pressing of bent laminated assemblies, comprising two sheets of glass and an interposed sheet of thermoplastic material which are to be bonded together into a unitary structure by the action of heat and pressure, which apparatus comprises, in combination, upper and lower pressing rolls arranged to provide a confined passage therebetween, means mounting the rolls for swinging movement as a unit about a horizontal axis to dispose said confined passage in a position for receiving the leading end of a bent laminated assembly, means for driving at least one of said rolls to feed the assembly therebetween and to discharge the same therefrom, a gear carried by the mounting means for swinging said mounting means and said rolls about said horizontal axis, and control means for varying the rate of swinging movement of said rolls, said control means including a sliding cam, a rack carried by said cam and operatively connected to said gear, drive means for sliding said cam and rack to rotate said gear and swing the rolls as a unit about said horizontal axis, and means actuated by said cam for controlling the drive means to vary the rate of sliding movement of said rack and the swinging movement of said rolls whereby to maintain the surfaces of the bent laminated assembly substantially normal to a line passing through the axes of the said rolls.

5. Apparatus for the preliminary pressing of bent laminated assemblies as claimed in claim 4, in which the drive means is a fluid drive means and the means actuated by the cam comprises a valve for controlling the amount of fluid supplied to said fluid drive means.

6. Apparatus for the preliminary pressing of bent laminated assemblies as claimed in claim 4, in which said sliding cam is provided with a curved contoured actuating surface which causes said cam actuated means to vary the rate of sliding movement of the said cam and rack in response to the change in contour of said actuating surface.

7. Apparatus for the preliminary pressing of bent laminated assemblies as claimed in claim 5, in which said sliding cam is provided with actuating portions for varying the amount of fluid supplied by said valve to said fluid drive means to thereby vary the rate of sliding movement of the cam and effect a corresponding change in the rate of swinging movement of the rolls.

8. Apparatus for the preliminary pressing of bent laminated assemblies as claimed in claim 5, in which said fluid drive means comprises a double acting cylinder, a piston operatively connected to said sliding cam, and means for supplying a pressurized fluid to said cylinder.

References Cited in the file of this patent

UNITED STATES PATENTS

| | | |
|---|---|---|
| 2,729,581 | Pascoe et al. | Jan. 3, 1956 |
| 2,825,671 | Langhart et al. | Mar. 4, 1958 |
| 2,831,791 | Downes et al. | Apr. 22, 1958 |
| 2,849,345 | Smith et al. | Aug. 26, 1958 |